US009075507B2

(12) United States Patent
Dempski

(10) Patent No.: US 9,075,507 B2
(45) Date of Patent: Jul. 7, 2015

(54) SILENCE REMINDER

(71) Applicant: Cellco Partnership, Arlington, VA (US)

(72) Inventor: David R. Dempski, Washington, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 177 days.

(21) Appl. No.: 13/829,381

(22) Filed: Mar. 14, 2013

(65) Prior Publication Data
US 2014/0282174 A1    Sep. 18, 2014

(51) Int. Cl.
*G06F 3/0482* (2013.01)
*G06F 3/0488* (2013.01)

(52) U.S. Cl.
CPC ............ *G06F 3/0482* (2013.01); *G06F 3/0488* (2013.01)

(58) Field of Classification Search
CPC ........................... G06F 3/0484; G06F 3/04842
USPC .......................................................... 715/771
See application file for complete search history.

(56) References Cited

U.S. PATENT DOCUMENTS

| 4,491,827 | A * | 1/1985 | Sugiura et al. ................. 341/22 |
| 7,671,756 | B2 * | 3/2010 | Herz et al. ..................... 340/669 |
| 8,433,291 | B1 * | 4/2013 | Hertzfeld et al. .............. 455/411 |
| 8,452,338 | B2 * | 5/2013 | Yeh et al. ....................... 455/566 |
| 8,611,272 | B1 * | 12/2013 | Hertzfeld et al. .............. 370/318 |
| 2004/0252109 | A1 * | 12/2004 | Trent et al. .................... 345/174 |
| 2008/0165022 | A1 * | 7/2008 | Herz et al. ..................... 340/669 |
| 2010/0261505 | A1 * | 10/2010 | Yeh et al. ....................... 455/564 |
| 2012/0242584 | A1 * | 9/2012 | Tuli ............................... 345/173 |
| 2012/0242586 | A1 * | 9/2012 | Krishnaswamy et al. .... 345/173 |
| 2012/0319984 | A1 * | 12/2012 | Borovsky et al. .............. 345/173 |
| 2013/0002590 | A1 * | 1/2013 | Borovsky et al. .............. 345/173 |
| 2013/0250034 | A1 * | 9/2013 | Kang et al. ................. 348/14.02 |
| 2014/0026105 | A1 * | 1/2014 | Eriksson et al. ............... 715/863 |
| 2014/0282174 | A1 * | 9/2014 | Dempski ....................... 715/771 |

* cited by examiner

*Primary Examiner* — Steven Sax
*Assistant Examiner* — David Choi

(57) ABSTRACT

A computing device may store a notification selection application executable by a processor of the computing device to provide operations including providing a user interface of a computing device including a notification selection control configured to receive user selection of a notification mode from a normal mode in which device notifications are enabled, a silent mode in which device notifications are disabled, and a timer mode in which device notifications are temporarily disabled until expiration of a countdown timer; receiving a gesture to select the timer mode from the notification selection control; starting the countdown timer based on receiving the gesture to select the timer mode; and automatically transitioning the computing device from the timer mode to the normal mode upon expiration of the countdown timer.

20 Claims, 8 Drawing Sheets

SILENCE REMINDER

BACKGROUND

Many wireless devices utilize haptic or audible feedback mechanisms to call user attention to their devices. Because users may not always wish to be notified, such devices often include simple mechanisms to globally turn off notifications of incoming calls, messages and other types of alerts. For instance, a user may turn off notifications before a meeting, while watching a movie, or before going to sleep. Sometimes, the user fails to remember to re-enable notifications. Missed calls, e-mails and text messages may result.

DETAILED DESCRIPTION

A user interface may include a notification selection control configured to allow a user to choose between a normal notification mode in which sounds and alerts are enabled, and a silent mode in which notifications are disabled. The notification selection control may further include a timer mode, in which notifications are temporarily disabled until a countdown timeout expires. Once the countdown timer expires, the notification selection control may automatically return to the normal notification mode, without requiring user interaction.

An exemplary touch screen interface may include a notification selection control providing for selection between the notification, silent, and timer modes. For instance, a swipe in a first direction (e.g., to the left) may cause the computing device to transition from the notification mode to the silent mode, while a swipe in the opposite direction (e.g., to the right) may cause the computing device to transition from the silent mode to the notification mode.

A swipe in a third direction, such as a direction orthogonal to the first direction (e.g., down), may cause the computing device to transition from either the silent mode or the notification mode into the timer mode. In some examples, the timer mode may initialize the countdown timer with a default amount of time (e.g., five minutes). The amount of time applied to the countdown timer may increment according to how long the user holds the swipe. The notification selection control may further provide an indication of an amount of time being applied to the countdown timer as it is being applied, such that a user may continue to hold the swipe and add time until the timeout reaches a desired value (or swipe in the opposite direction to remove time if too much is applied). Likewise, the notification selection control may also provide an indication of time remaining before the timeout expires and the computing device returns to the notification mode.

The notification selection control may further allow the user to alter an amount of time remaining on the countdown timer. For example, while in the timer mode, the user may perform a swipe in the third direction to add more time to the countdown timer, and may perform a swipe in a direction opposite to the third direction to remove time from the countdown timer. The user may elect to cancel the timer entirely, such as by performing a swipe in the opposite of the first direction to cause the device to transition back to the notification mode.

Figure 1:
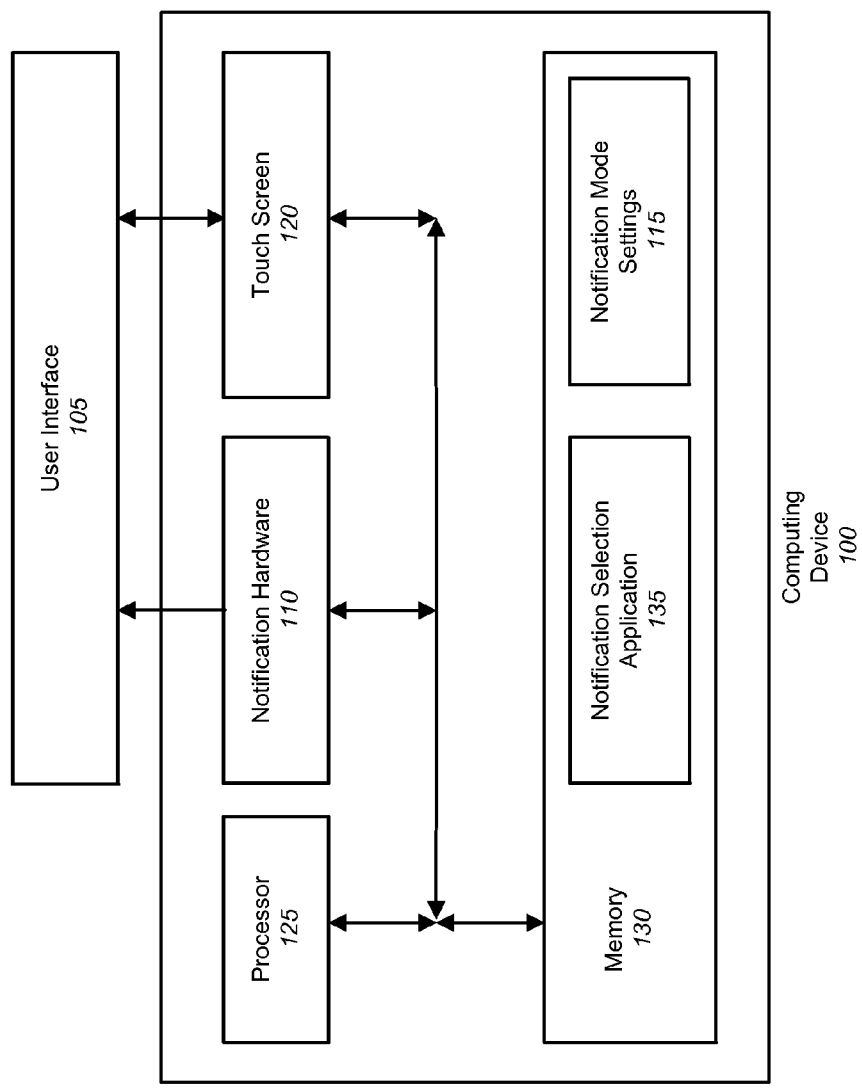
FIG. 1 illustrates an exemplary computing device configured to provide selection of notification modes in a user interface.

FIG. 1 illustrates an exemplary computing device 100 configured to provide selection of notification modes in a user interface 105. The computing device 100 may be implemented as a combination of hardware and software, including notification hardware 110 controlled according to notification mode settings 115, a touch screen 120 display, and one or more processors 125 that execute computer instructions stored on one or more non-transitory computer-readable media such as a memory 130. A notification selection application 135 may be one such application included on the memory 130 of the computing device 100, and may be implemented at least in part by instructions stored on the memory 130. The memory 130 may further store other types of information, such as the notification mode settings 115. The computing device 100 may take many different forms and includes multiple and/or alternate components and facilities. While an exemplary computing device 100 is shown in FIG. 1, the exemplary components illustrated of the computing device 100 are not intended to be limiting. Indeed, additional or alternative components and/or implementations may be used.

The user interface 105 may allow for the operation and control of the computing device 100 by a user. The user interface 105 may further provide feedback and other output to the user through use of hardware and software included in the computing device 100.

The notification hardware 110 may include any of various user interface 105 devices suitable for notifying or otherwise calling attention of a user of the computing device 100. Exemplary notification hardware 110 may include a sound transducer configured to generate audible sound, a haptic feedback device configured to generate device vibration, or a light producing device configured to provide visually-perceptible output.

The notification mode settings 115 may include various settings utilized by the computing device 100 to control the notification hardware 110. An exemplary notification mode setting 115 may be a default mode, or normal notification mode, in which sounds and alerts to be provided by the notification hardware 110 are enabled. The notification mode settings 115 may also include a silent mode in which the notification hardware 110 is disabled from providing notifications to the user. The notification mode settings 115 may further include a timer mode, in which notifications provided by the notification hardware 110 are temporarily disabled until a countdown timeout expires. While in the timer mode, the notification mode settings 115 may further maintain a setting indicative of an amount of time remaining on the countdown timer.

The touch screen 120 may include a visual user interface 105 device configured both to display content to a user and also to receive touch input from the user. An exemplary touch input may include a user tapping a location on the touch screen 120 with a finger. Based on the touch input, the touch screen 120 may forward user input information to other components of the computing device 100 for processing. For instance, the touch screen 120 may forward information indicative of the location and time at which the touch screen 120 was tapped.

Another type of exemplary touch input may include a user touching down at a location on the touch screen 120 and then dragging in a sliding motion to another location on the touch screen 120. After completing the motion, the user may discontinue interacting with the touch screen 120. These types of touch inputs may be referred to as swipe gestures, and the act of performing these inputs may be referred to as swiping or performing a swipe.

In some cases, the touch screen 120 may be able to register multiple touch inputs substantially simultaneously. Touch screen 120 capable of receiving these multiple inputs may be referred to as multi-touch screens 120. For example, a multi-touch screen 120 may receive touch input based on a user swiping multiple fingers in substantially the same direction (e.g., to request a scrolling action), or swiping multiple fingers in opposite directions in a pinching motion (e.g., to request zooming in or out).

The touch screen 120 may be further configured to interpret the swipe gestures, and to determine a direction of the swipe gesture input. As one approach, the touch screen 120 may be configured to determine a horizontal swipe distance and a vertical swipe distance based on the origination and destination locations of the swipe gesture. The touch screen 120 may accordingly determine the overall direction of the swipe according to which of the horizontal swipe distance and vertical swipe distance is larger. The touch screen 120 may further determine whether the swipe was performed in a positive or negative horizontal direction (e.g., left or right) or a positive or negative vertical direction (e.g., up or down) according to the coordinates of the origination point and the destination point of the swipe. In some examples, processing of gestures to the touch screen 120 may instead be performed by a dedicated input/output processor 125, or by another processor 125 of the computing device 100.

The notification selection application 135 may be stored on the memory 130 of the computing device 100, and, when executed by a processor 125 of the computing device 100, may be configured to provide a user interface 105 allowing for user control of the notification mode settings 115. By interacting with the user interface 105 of the notification selection application 135, a user of the computing device 100 may be able to adjust the mode of operation of the notification hardware 110. Exemplary user interface 105 of the notification selection application 135 are discussed in detail below with respect to FIGS. 2-7.

Figure 2:
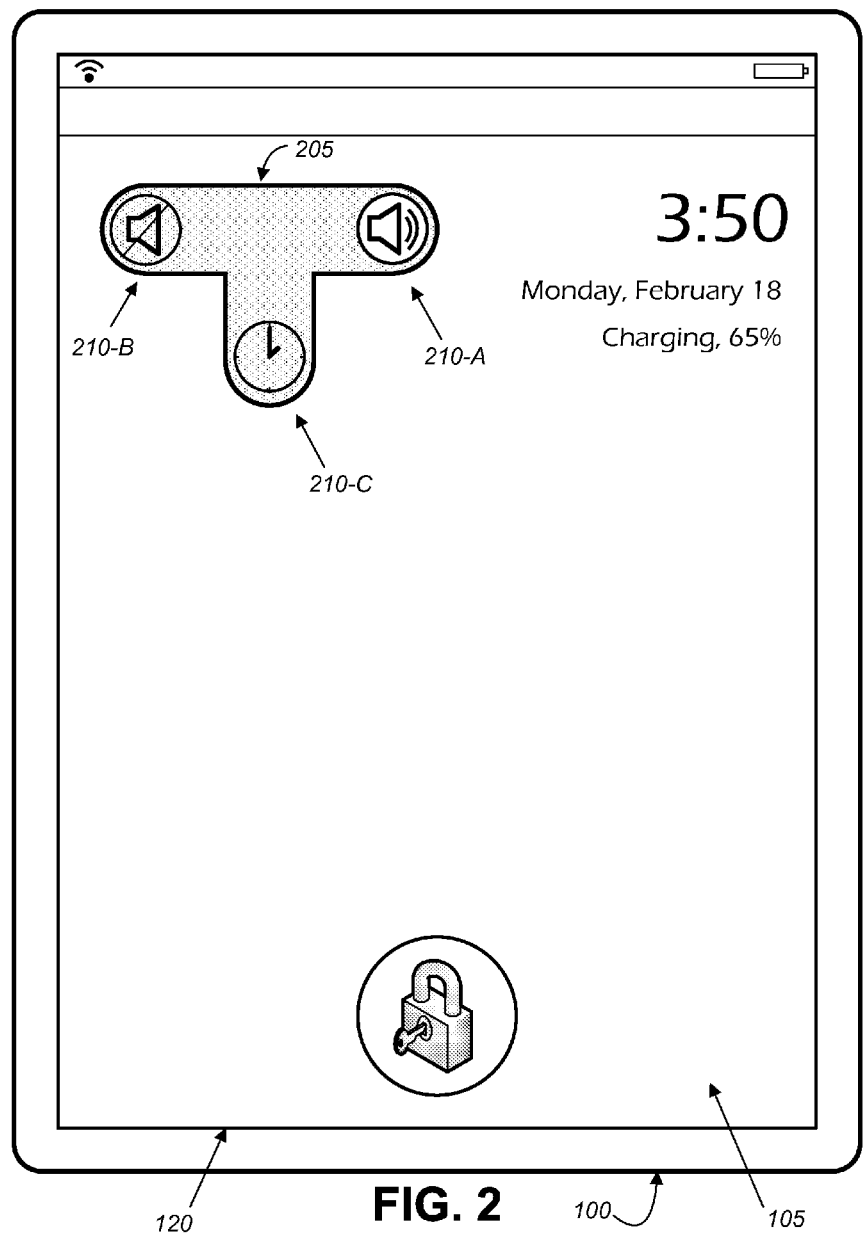
FIG. 2 illustrates an exemplary user interface of a computing system including a notification selection control.

FIG. 2 illustrates an exemplary user interface 105 of a computing device 100 including a notification selection control 205. The notification selection control 205 may be provided on the user interface 105 of the computing device 100 by the notification selection application 135. The notification selection control 205 may be configured to illustrate to a user the current notification mode settings 115 of the computing device 100.

As shown, the notification selection control 205 includes a mode indication 210-A indicative of the normal mode (e.g., the representation of a speaker playing sound), a mode indication 210-B indicative of the silent mode (e.g., the representation of a speaker overlaid by a prohibition sign), and a mode indication 210 indicative of the timer mode (i.e., the representation of a timer). The notification selection control 205 may be further configured to visually indicate which of the modes is active. For instance, in FIG. 2, the mode indication 210-A is displayed with an active background to indicate that the computing device 100 is in the normal mode with notifications enabled.

The notification selection control 205 may further be configured to allow the user to change the computing device 100 from one notification mode to another. For instance, a user may provide touch input to the touch screen 120, such as swiping or holding actions, to request the notification selection application 135 to alter the current notification mode settings 115 of the computing device 100. FIGS. 3-7 illustrate further details of the notification selection control 205 responsive to such user interactions.

Figure 3:
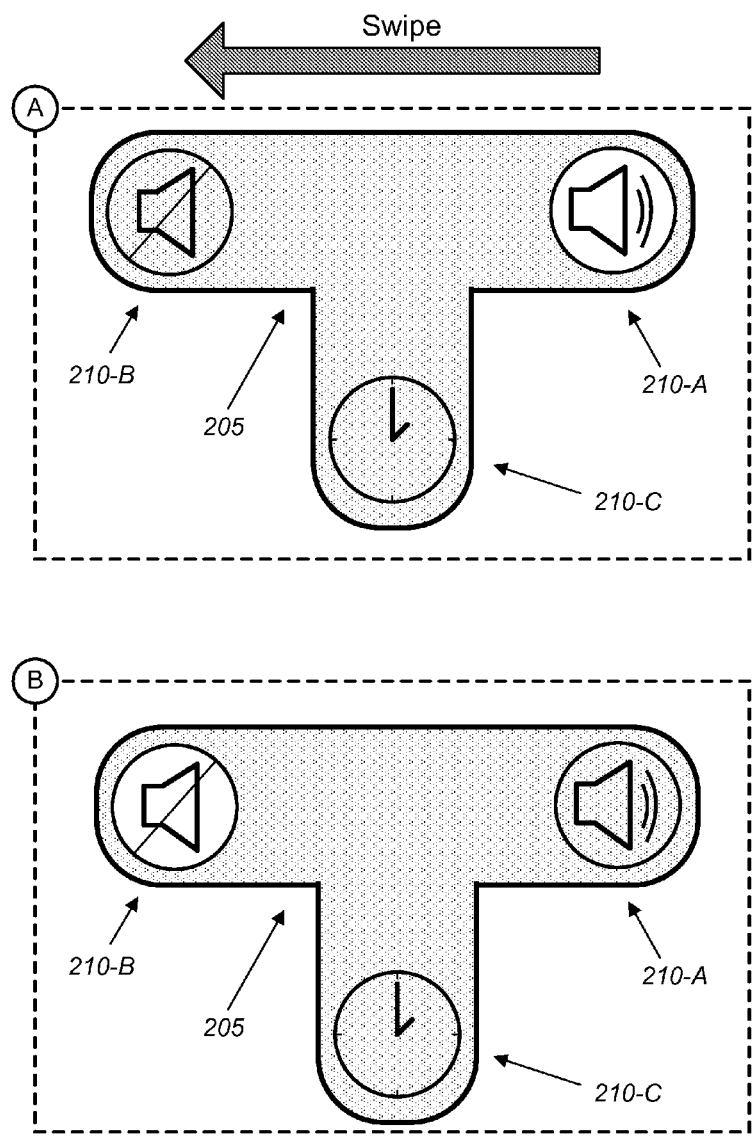
FIG. 3 illustrates an exemplary transition from a normal mode to a silent mode using a notification selection control.

FIG. 3 illustrates an exemplary transition from a normal mode to a silent mode using a notification selection control 205. To request the transition, a user may provide touch input to the notification selection control 205 displayed on the touch screen 120. For instance, as shown at index A, the user may provide a swipe gesture from the mode indication 210-A indicative of the normal mode to the mode indication 210-B indicative of the silent mode. The notification selection application 135 may accordingly be informed of the swipe gesture performed on the touch screen 120, and may alter the notification mode settings 115 from the normal mode to the silent mode. As shown at index B responsive to the swipe gesture, the notification selection application 135 may update the notification selection control 205 to display the mode indication 210-B as active, thereby providing a visual indication of the updated notification mode settings 115.

Figure 4:
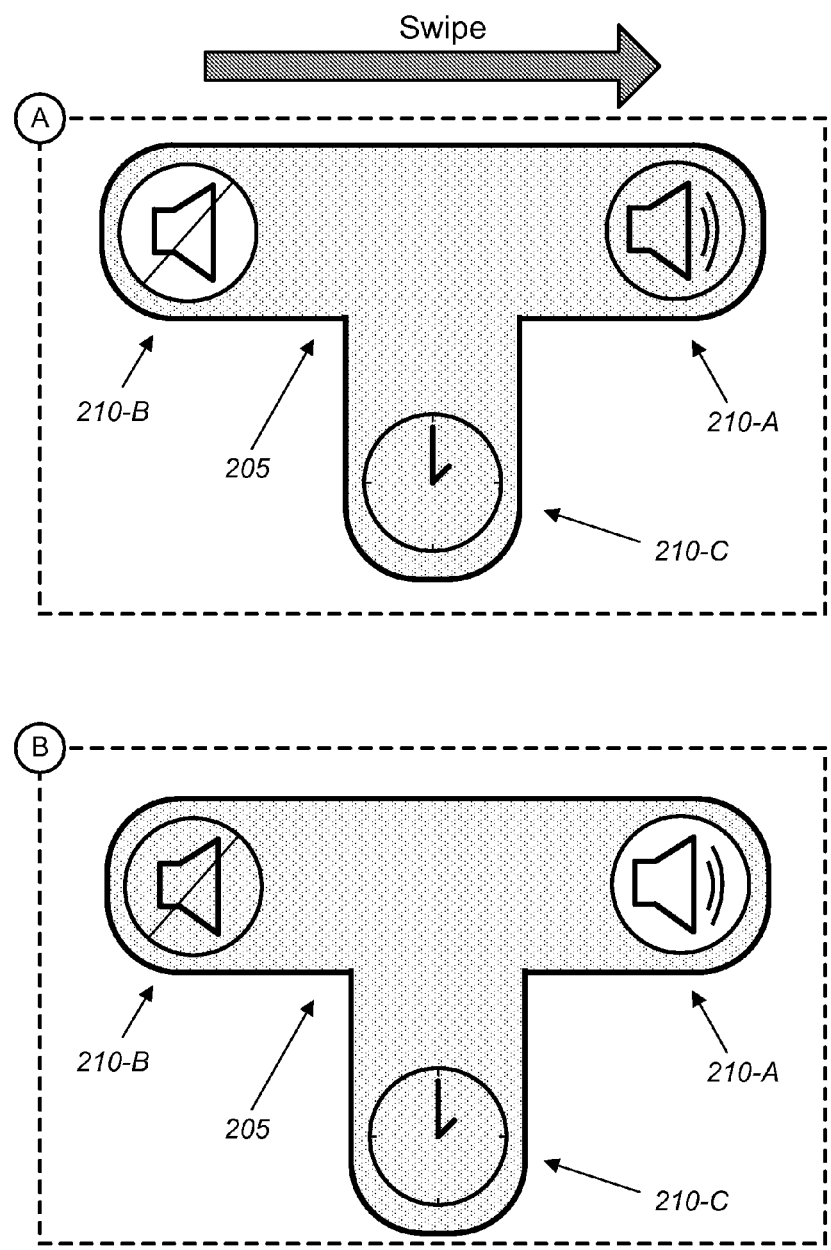
FIG. 4 illustrates an exemplary transition from a silent mode to a normal mode using a notification selection control.

FIG. 4 illustrates an exemplary transition from a silent mode to a normal mode using a notification selection control 205. For instance, as shown at index A, the user may provide a swipe gesture from the mode indication 210-B indicative of the silent mode to the mode indication 210-A indicative of the normal mode. As shown at index B responsive to the swipe gesture, the notification selection application 135 may alter the notification mode settings 115 from the silent mode to the normal mode, and may update the notification selection control 205 to display the mode indication 210-A as active.

Figure 5:
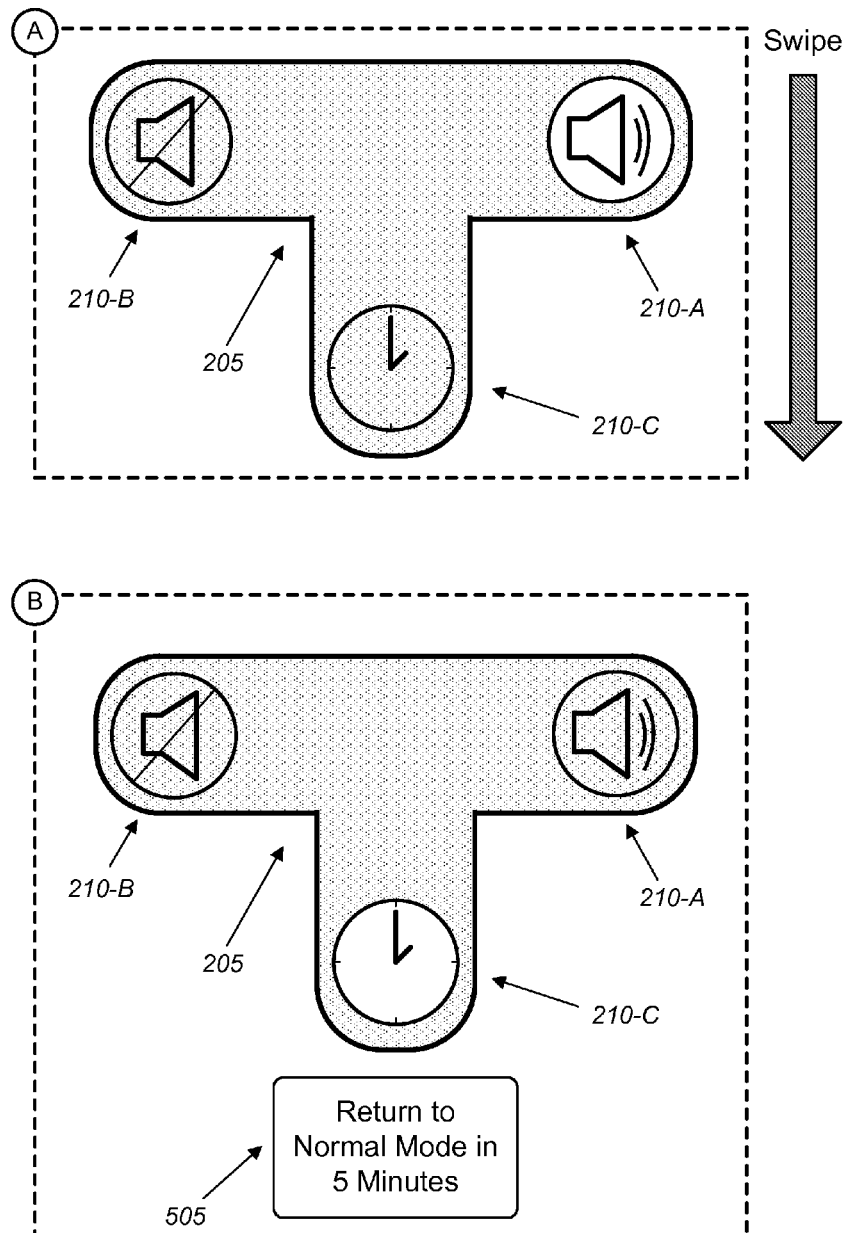
FIG. 5 illustrates an exemplary transition from a normal mode to a timer mode using a notification selection control

FIG. 5 illustrates an exemplary transition from a normal mode to a timer mode using a notification selection control 205. For instance, as shown at index A, the user may provide a swipe gesture from the mode indication 210-A indicative of the normal mode to the mode indication 210-C indicative of the timer mode. (While not shown, a similar swipe gesture may also be used to transition from the silent mode to the timer mode.) In some examples, the swipe gesture to the mode indication 210-C may be performed in a direction orthogonal to the direction of the swipes between the mode indications 210-A and 210-B discussed above with respect to FIGS. 3 and 4. In some embodiments, the swipe gesture to the mode indication 210-C may be contiguous with the swipes between the mode indications 210-A and 210-B such that the swipe gesture to the mode indication 210-C starts in the direction of the swipes between the mode indications 210-A and 210-B and then contiguously, without the user removing the object doing the swiping from the user interface 105, transitions to the direction orthogonal to the direction of the swipes between the mode indications 210-A and 210-B.

As shown at index B responsive to the swipe gesture, the notification selection application 135 may alter the notification mode settings 115 from the normal mode to the timer mode such that notifications are temporarily disabled until a countdown timeout expires. The notification selection application 135 may further alter the notification mode settings 115 to include a value indicative of an amount of time for the computing device 100 to remain in the timer mode before automatically transitioning to the normal mode, and may start the countdown timer.

The amount of time to remain in the timer mode may be initialized to a default timeout setting value (e.g., 5 minutes, 60 minutes, etc.). In some cases, the amount of time to remain in the timer mode may be based on the length of the orthogonal swipe. For instance, the transition to the timer mode may require a swipe gesture of at least a predefined length (e.g., at least the distance from the path between the mode indications 210-A and 210-B and the mode indication 210-C). Additional swipe distance beyond a threshold distance may further be used to increase the initial amount of time to be added to the countdown timer.

The notification selection application 135 may update the notification selection control 205 to display the mode indication 210-C as active. Moreover, the notification selection application 135 may further display a countdown indication 505 in the user interface 105 to inform the user of the remaining time on the countdown timer. The countdown indication 505 may be periodically updated by the notification selection application 135 to display the remaining time on the countdown timer.

Figure 6:
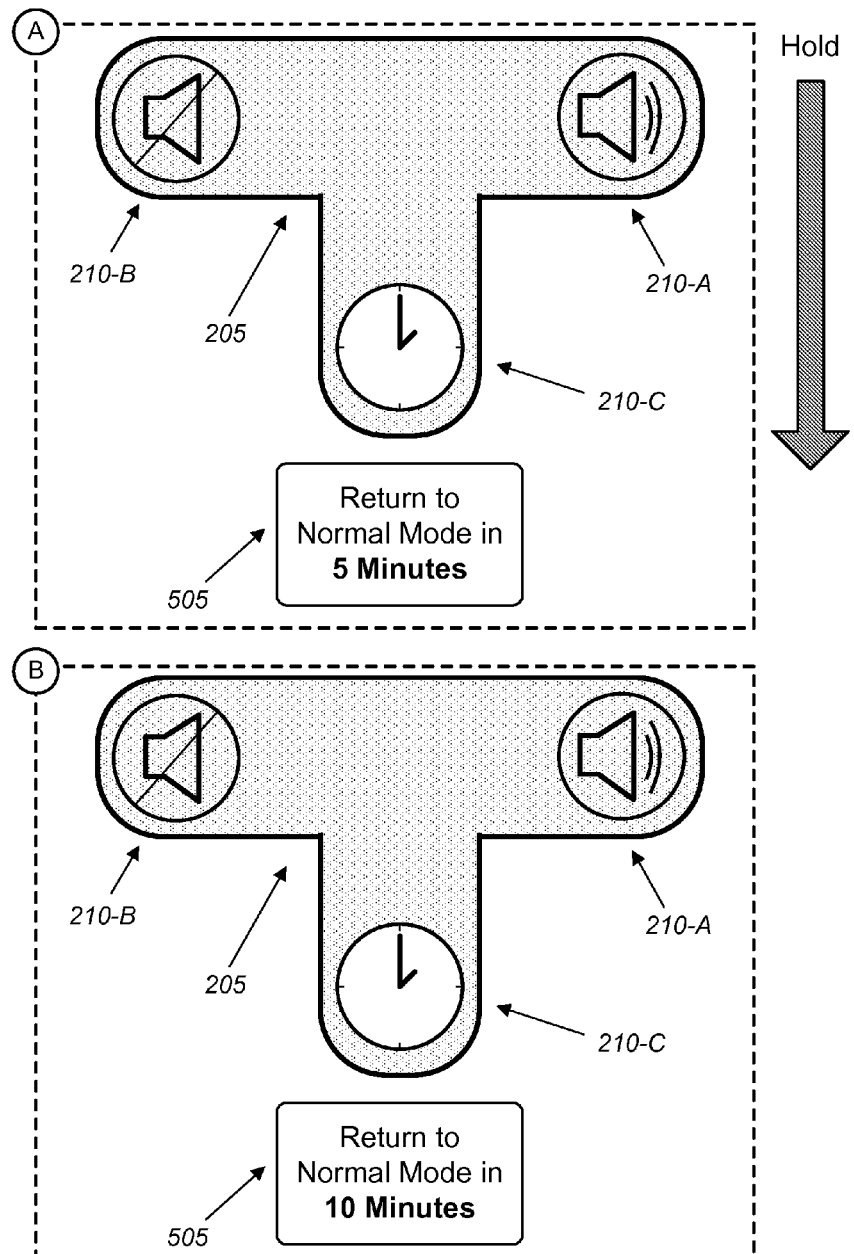
FIG. 6 illustrates an exemplary inclusion of addition of time on a countdown timer of a timer mode using a notification selection control.

FIG. 6 illustrates an exemplary inclusion of addition of time on a countdown timer of a timer mode using a notification selection control 205. As discussed above with respect to FIG. 5, the user may provide a swipe gesture to transition the computing device 100 to the timer mode, applying a default timeout to the countdown timer. In some cases, the user may wish for the computing device 100 to spend additional time in the timer mode before automatically transitioning to the normal mode. As shown at index A, the user may hold the swipe gesture discussed above with respect to FIG. 5, such that the longer the swipe gesture is held, the more time is applied to the countdown timer. As shown at index B, the countdown indication 505 in the user interface 105 has been updated to reflect the addition of additional time to remain in the timer mode.

In some examples, continuing to hold the swipe gesture may increment the amount of time by one increment interval (e.g., add additional one minute intervals per second held), while movement while continuing to hold the swipe gesture may increment the amount of time by a greater increment interface (e.g., add additional ten minute intervals per additional second of movement). In some examples, the user may add additional time to the countdown timer by performing a second swipe gesture in the same direction as done to transition to the timer mode. In some examples, the user may also remove time by swiping back in an opposite direction from the swipe gesture used to transition into the timer mode, either as part of the swipe gesture used to make the transition, or as part of a second swipe gesture.

Figure 7:
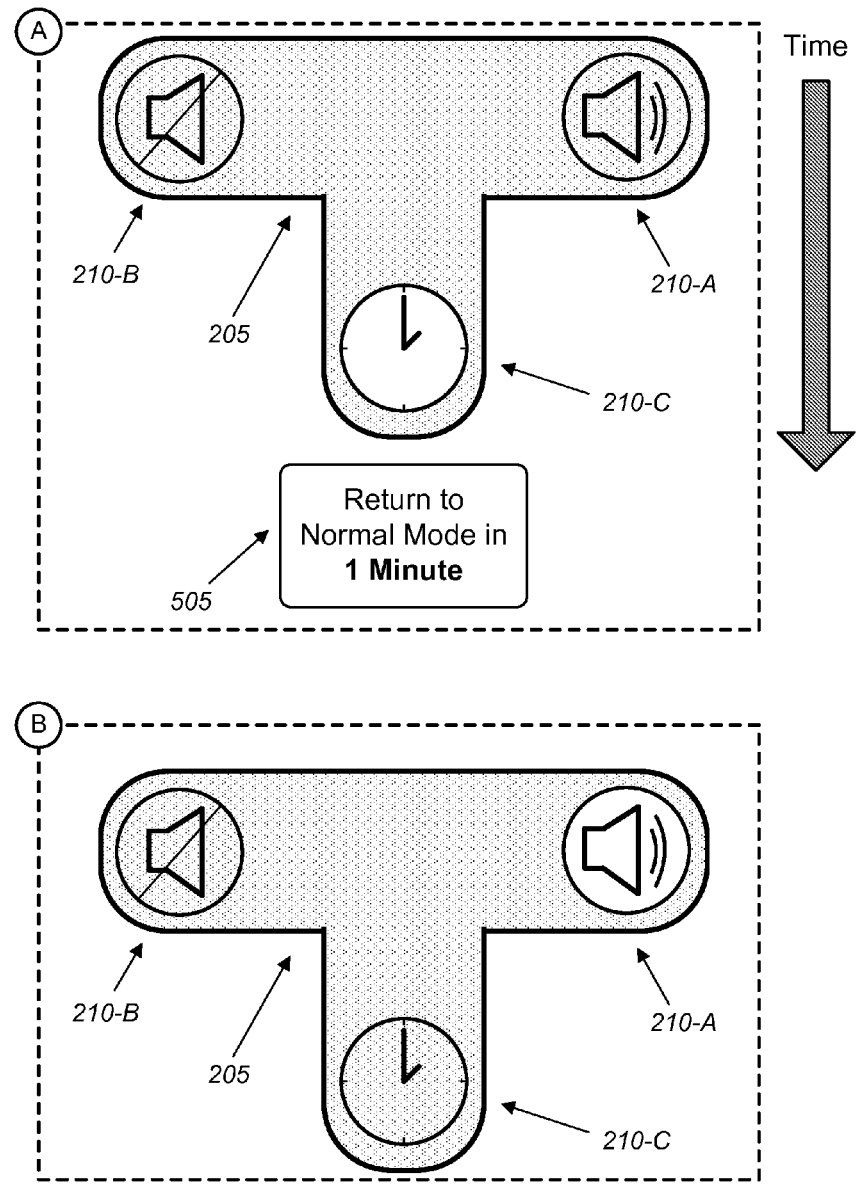
FIG. 7 illustrates an exemplary automatic transition from a timer mode to a normal mode.

FIG. 7 illustrates an exemplary automatic transition from a timer mode to a normal mode. As shown at index A, a computing device 100 may be in a timer mode with little time remaining on a countdown timer. After that time passes, the countdown timer expires. As shown at index B, upon expiration of the countdown timer, the notification selection application 135 transitions the computing device 100 to the normal mode, without requiring further action from the user. For example, the notification selection application 135 may alter the notification mode settings 115 from the timer mode to the normal mode, may remove the countdown indication 505 from the user interface 105, and may update the display of the notification selection control 205 to indicate that the normal mode is the current mode.

Figure 8:
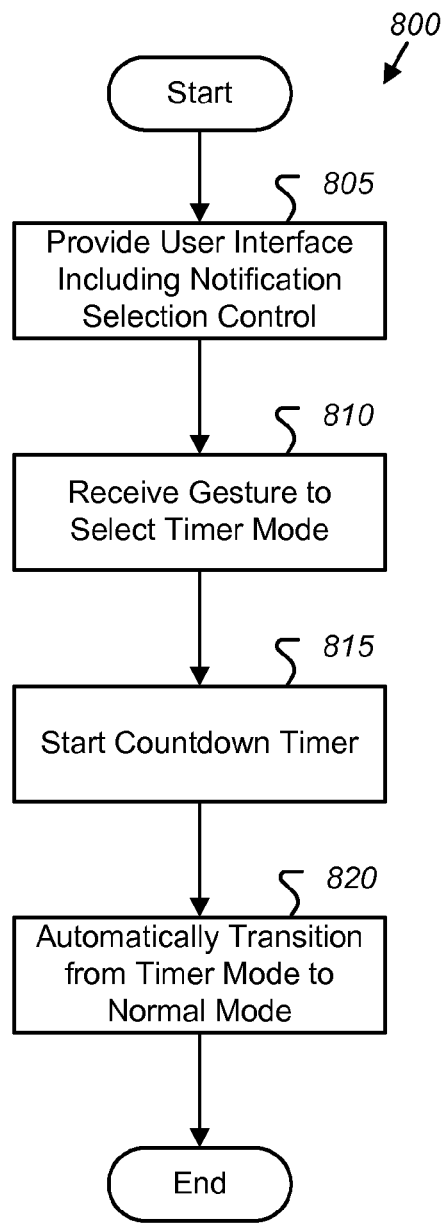
FIG. 8 illustrates an exemplary process for the automatic transitioning of a notification selection control from a timer mode to a normal mode.

FIG. 8 illustrates an exemplary process 800 for the automatic transitioning of a notification selection control 205 from a timer mode to a normal mode. The process 800 may be performed by various devices, such as by a computing device 100 executing a notification selection application 135 stored in a memory 130 using one or more processors 125 of the computing device 100.

In block 805, the notification selection application 135 provides a user interface 105 including a notification selection control 205. The notification selection control 205 may be configured to receive a user selection of a notification mode from a normal mode in which device notifications are enabled, a silent mode in which device notifications are disabled, and a timer mode in which device notifications are temporarily disabled until expiration of a countdown timer. Aspects of exemplary notification selection controls 205 are discussed above with respect to FIGS. 2-7.

In block 810, the notification selection application 135 receives a gesture to select the timer mode from the notification selection control 205. For example, as illustrated in the exemplary notification selection control 205 of FIG. 5, a user may provide a swipe gesture from a mode indication 210-A indicative of the normal mode or a mode indication 210-B indicative of the silent mode to a mode indication 210-C indicative of the timer mode. In some cases, the swipe gesture to the mode indication 210-C may be performed in a direction orthogonal to the direction of swipe gestures facilitating selection between the mode indications 210-A and 210-B.

In block 815, the notification selection application 135 starts a countdown timer. For example, responsive to receiving the gesture to select the timer mode, the notification selection application 135 may alter the current notification mode settings 115 from the normal mode to the timer mode. The notification selection application 135 may further alter the notification mode settings 115 to include a value indicative of an amount of time for the computing device 100 to remain in the timer mode before automatically transitioning to the normal mode, and may start the countdown timer. The amount of time to remain in the timer mode may be initialized to a default timeout setting value. The notification selection application 135 may further display a countdown indication 505 in the user interface 105 to inform the user of the remaining time on the countdown timer, such as illustrated in FIGS. 5-7.

In block 820, the notification selection application 135 automatically transitions the computing device 100 from the timer mode to the normal mode. For example, as time passes the countdown timer may run down and expire. Upon expiration of the countdown timer, the notification selection application 135 may transition the computing device 100 to the normal mode, without requiring any further user interface 105 action. The notification selection application 135 may further remove the countdown indication 505 from the user interface 105, and may update the display of the notification selection control 205 to indicate that the normal mode is the current mode. After block 820, the process 800 ends.

Thus, a notification selection control 205 used to select between a normal mode in which notifications are enabled and a silent mode in which notifications are disabled may also be used to select a timer mode. In the timer mode, notifications are disabled as done in the silent mode, until expiration of a countdown timer, whereupon the computing device 100 is automatically transitioned back to the normal mode in which notifications are enabled, without requiring any further action from the user.

While the timeout mode is described herein with respect to a swipe in a direction orthogonal to the direction used to swipe between normal mode and silent mode, it should be noted that other approaches are possible. For example, rather than a swipe in a direction orthogonal to the direction used to select between normal and silent modes, a swipe in the same direction as used to swipe between the normal mode and silent mode may be performed using two fingers instead of one to cause the device to transition into the timer mode.

As another possibility, the notification selection control 205 may be configured to receive or allow the user to select a swipe pattern using the touch screen 120, and then use the swipe pattern in a similar fashion as the orthogonal swipe to select the timer mode as opposed to the normal mode or the silent mode. The notification selection control 205 may further be configured to allow the user to assign different amounts of time to the different swipe patters to facilitate the quick selection of the timer mode with a given amount of countdown time. For instance, a circular motion may be configured to select the timer mode for thirty minutes (or add thirty minutes to the countdown timer), while a reverse circle mode may be configured to select the timer mode for sixty minutes (or add sixty minutes to the countdown timer). Multiple swipe patterns may be performed in a continuous motion (potentially separated by movements parallel to the swipe direction between the normal mode and the silent mode) to aid in the entering of an amount of time to the countdown timer. It should also be noted that certain swipe gestures may be assigned an amount of time to be removed from the countdown timer (e.g., take away ten minutes), as another way to aid in the entering of an amount of time.

As another example, for user interfaces 105 lacking or not requiring use of a touch screen 120, the timer mode may be activated by another mechanism, such as by pressing and holding both a volume up and a volume down button simultaneously for a predetermined period of time (e.g., 3 seconds) or holding a user interface 105 element for toggling between normal and silent modes. Using such a mechanism, once the timer mode has been activated by holding the buttons over the predetermined amount of time, additional button interactions may be utilized to facilitate the incrementing or decrementing similar to the use of the additional gesture inputs described above with respect to touch screen 120 implementations. As one example, additional time that the buttons are held over the threshold time may add additional time to the countdown timer. As another example, once the timer mode has been activated by holding the buttons over the predetermined amount of time, the volume up and down buttons may be utilized to increment or decrement the amount of time on the countdown timer until no button presses are received for a predetermined amount of time. After the predetermined amount of time for adjustment of the countdown timer has elapsed, further button presses of the volume up and down buttons may transition the device out of the timer mode back into the normal mode (e.g., if volume up is pressed) or the silent mode (e.g., if volume down is pressed).

In general, computing systems and/or devices, such as the computing device 100, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the computing device 100 generally include computer-executable instructions such as the instructions of the notification selection application 135, where the instructions may be executable by one or more processors 125. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor 125 or microprocessor 125 receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor 120 of a computing device 100). The memory 130 may be one such computer-readable medium. Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory 130. Such instructions may be transmitted by one or more transmission media, including coaxial cables, copper wire and fiber optics, including the wires that comprise a system bus coupled to a processor 125 of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. The notification selection application 135 may be one such computer program product. In some example, the notification selection application 135 may be provided as software that when executed by one or more processors 125 provides the operations described herein. Alternatively, the notification selection application 135 may be provided as hardware or firmware, or combinations of software, hardware and/or firmware.

With regard to the processes, systems, methods, heuristics, etc. described herein, such as the process 800, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile touchscreen computing device storing a notification selection application, the notification selection application being executable by a processor of the mobile touchscreen computing device to provide operations comprising:
   providing a user interface including a notification selection control configured to receive user selection of a notification mode from a set of notification modes including (i) a normal mode in which device notifications are enabled, (ii) a silent mode in which device notifications are disabled, and (iii) a timer mode in which device notifications are temporarily disabled until expiration of a countdown timer, the notification selection control having a mode indication for each of the normal mode, the silent mode, and the timer mode;
   receiving a gesture from a first set location at the mode indication for one of the normal mode or the silent mode to a second set location at the mode indication for the timer mode to select the timer mode from the notification selection control;
   starting the countdown timer based on receiving the gesture to select the timer mode;
   automatically transitioning the mobile touchscreen computing device from the timer mode to the normal mode upon expiration of the countdown timer; and
   wherein the gesture to select the timer mode is a swipe gesture of at least a predefined length, and wherein the notification selection application further provides operations comprising increasing an amount of time assigned to the countdown timer based on a swipe distance beyond the predefined length.

2. The mobile touchscreen computing device of claim 1, wherein the swipe gesture to select the timer mode is in a direction orthogonal to a swipe gesture performed to select at least one of the silent mode and the normal mode.

3. The mobile touchscreen computing device of claim 1, wherein the notification selection application further provides operations comprising displaying a countdown indication in the user interface informing of remaining time on the countdown timer.

4. The mobile touchscreen computing device of claim 1, wherein the notification selection application further provides operations comprising initiating the countdown timer with a default amount of time upon receiving the gesture to select the timer mode.

5. The mobile touchscreen computing device of claim 4, wherein the notification selection application further provides operations comprising increasing the amount of time assigned to the countdown timer based on an amount of time the gesture to select the timer mode is held down.

6. The mobile touchscreen computing device of claim 4, wherein the notification selection application further provides operations comprising: receiving a second gesture in a direction opposite to a direction of the gesture to select the timer mode; and reducing the amount of time to select the timer mode from the notification selection control based on the second gesture.

7. The mobile touchscreen computing device of claim 1, wherein the notification selection application further provides operations comprising: receiving a second gesture to select one of the normal mode and the silent mode; and transitioning the mobile touchscreen computing device from the timer mode to the one of the normal mode and the silent mode, without waiting for expiration of the countdown timer.

8. A method, comprising:
   providing a user interface of a mobile touchscreen computing device including a notification selection control receiving user selection of a notification mode from a set of notification modes including (i) a normal mode in which device notifications are enabled, (ii) a silent mode in which device notifications are disabled, and (iii) a timer mode in which device notifications are temporarily disabled until expiration of a countdown timer, the notification selection control having a mode indication for each of the normal mode, the silent mode, and the timer mode;
   receiving, by a touch screen of the mobile touchscreen computing device, a gesture from a first set location at the mode indication for one of the normal mode or the silent mode to a second set location at the mode indication for the timer mode to select the timer mode from the notification selection control;
   starting the countdown timer based on receiving the gesture to select the timer mode;
   automatically transitioning the mobile touchscreen computing device from the timer mode to the normal mode upon expiration of the countdown timer; and
   wherein the gesture to select the timer mode is a swipe gesture of at least a predefined length, and wherein the notification selection application further provides operations comprising increasing an amount of time assigned to the countdown timer based on a swipe distance beyond the predefined length.

9. The method of claim 8, wherein the swipe gesture to select the timer mode is in a direction orthogonal to a swipe gesture performed to select at least one of the silent mode and the normal mode.

10. The method of claim 8, further comprising display a countdown indication in the user interface to inform the user of remaining time on the countdown timer.

11. The method of claim 8, further comprising initiating the countdown timer with a default amount of time upon receiving the gesture to select the timer mode.

12. The method of claim 11, further comprising:
receiving a second gesture in a direction opposite to a direction of the gesture to select the timer mode; and
reducing the amount of time to select the timer mode from the notification selection control based on the second gesture.

13. The method of claim 8, further comprising: receiving a second gesture to select one of the normal mode and the silent mode; and transitioning the mobile touchscreen computing device from the timer mode to the one of the normal mode and the silent mode, without waiting for expiration of the countdown timer.

14. A non-transitory computer readable medium storing a notification selection application software program, the notification selection application being executable to provide operations comprising:
providing a user interface of a mobile touchscreen computing device including a notification selection control configured to receive user selection of a notification mode from a set of notification modes including (i) a normal mode in which device notifications are enabled, (ii) a silent mode in which device notifications are disabled, and (iii) a timer mode in which device notifications are temporarily disabled until expiration of a countdown timer, the notification selection control having a mode indication for each of the normal mode, the silent mode, and the timer mode; receiving a gesture from a first set location at the mode indication for one of the normal mode or the silent mode to a second set location at the mode indication for the timer mode to select the timer mode from the notification selection control; starting the countdown timer based on receiving the gesture to select the timer mode; automatically transitioning the mobile touchscreen computing device from the timer mode to the normal mode upon expiration of the countdown timer; and wherein the gesture to select the timer mode is a swipe gesture of at least a predefined length, and wherein the notification selection application further provides operations comprising increasing an amount of time assigned to the countdown timer based on a swipe distance beyond the predefined length.

15. The computer readable medium of claim 14, wherein the swipe gesture to select the timer mode is in a direction orthogonal to a swipe gesture performed to select at least one of the silent mode and the normal mode.

16. The computer readable medium of claim 14, wherein the notification selection application further provides operations comprising displaying a countdown indication in the user interface informing of remaining time on the countdown timer.

17. The computer readable medium of claim 14, wherein the notification selection application further provides operations comprising initiating the countdown timer with a default amount of time upon receiving the gesture to select the timer mode.

18. The computer readable medium of claim 17, wherein the notification selection application further provides operations comprising:
receiving a second gesture in a direction opposite to a direction of the gesture to select the timer mode; and
reducing the amount of time to select the timer mode from the notification selection control based on the second gesture.

19. The computer readable medium of claim 14, wherein the notification selection application further provides operations comprising: receiving a second gesture to select one of the normal mode and the silent mode; and transitioning the mobile touchscreen computing device from the timer mode to the one of the normal mode and the silent mode, without waiting for expiration of the countdown timer.

20. The mobile touchscreen computing device of claim 1, wherein the gesture to select the timer mode is a swipe gesture and is contiguous with a swipe gesture between the mode indications for the normal mode and the silent mode.

\* \* \* \* \*